United States Patent [19]

Redman

[11] Patent Number: 4,708,039

[45] Date of Patent: Nov. 24, 1987

[54] BAR FEEDING APPARATUS

[75] Inventor: Robert J. Redman, Indian River, Mich.

[73] Assignee: Tube Fab of Afton Corporation, Afton, Mich.

[21] Appl. No.: 830,111

[22] Filed: Feb. 18, 1986

[51] Int. Cl.[4] .......................... B23B 13/00; B23Q 5/22
[52] U.S. Cl. ..................................... 82/2.5; 279/23 A; 414/18
[58] Field of Search .............. 82/2.5; 279/23 A, 41 A, 279/46 A; 414/15, 18

[56] References Cited

U.S. PATENT DOCUMENTS

| | | | |
|---|---|---|---|
| 2,817,534 | 12/1957 | Cox | 279/23 A |
| 2,906,003 | 9/1959 | Lakins et al. | 414/15 |
| 3,066,806 | 12/1962 | Lakins et al. | 214/1.2 |
| 3,582,000 | 6/1971 | Werkmeister et al. | 214/1.1 |
| 3,612,298 | 10/1971 | Azuma | 214/1.2 |
| 3,820,668 | 6/1974 | Hesslein et al. | 414/15 |
| 3,924,494 | 12/1975 | Azuma | 82/2.7 |
| 4,068,545 | 1/1978 | Scheler | 82/1 C |

Primary Examiner—Leonidas Vlachos
Attorney, Agent, or Firm—Basile, Weintraub & Hanlon

[57] ABSTRACT

A stock pusher for a bar feed apparatus includes an improved bar gripping collet in which the bar gripping force applied by the collet may be easily adjusted in the field.

1 Claim, 2 Drawing Figures

BAR FEEDING APPARATUS

BACKGROUND OF THE INVENTION

The present invention is directed to improvements to bar feeding apparatus employed to feed elongate bar stock to a machine tool. In a typical application, the tool will form or otherwise perform an operation upon a relatively short length of the bar, cut off this short length from the bar and eject the formed piece, at which time the feed apparatus will again advance the bar into the tool. When all of the parts which can be formed from a single length of stock have been formed, a remnant will remain with the pusher and is carried by the pusher on its return stroke to an ejecting station at which the remnant is ejected and a fresh length of stock placed in front of the pusher to repeat the feeding cycle.

Many examples of this particular type of feeding apparatus are found in the prior art. See, for example, U.S. Pat. Nos. 3,066,806; 3,582,000; 3,612,298 and 3,924,494. Typically, in these prior art feeding apparatuses, the end of the bar remote from the tool is seated in a resilient split socket or collet which is in turn coupled to one run of an endless cable or chain employed to drive the pusher in the feeding and return strokes. During or prior to the cutting off of the part from the bar by the machine tool, the bar will normally be gripped or chucked by the tool and rotated; hence, the collet must be mounted for rotation relative to the structure employed to couple it to its drive chain or cable.

The grip of the collet upon the stock remnant must be firm enough to retain the stock remnant in the collet during the return stroke of the pusher, but not too firm to interfere with the action of the remnant ejection mechanism which typically takes the form of clamping jaws which are actuated to close upon the remnant as it passes the ejection station and pull the remnant from the collet as the pusher continues along its return stroke.

The collet is subjected to hard usage and requires frequent replacement which imposes practical cost limitations upon its production. As a result, the resilient gripping force of the collet as theoretically calculated by its designer is not always achieved in the collet as manufactured. Attempts to adjust this gripping force subsequent to the manufacture of the collet normally require heating of the collet and expanding or contracting the collet jaws to decrease or increase the gripping force in a trial-and-error process in which the collet must be cooled between each trial.

In addition to the difficulty in regulating the gripping force in the initial manufacturing process, the stock handled by the collet is normally not formed to highly precise dimensional tolerances, and oversized pieces forced too deeply into the collet's socket may spring the collet beyond its elastic limit with a consequent reduction in gripping force.

SUMMARY OF THE INVENTION

In accordance with the present invention, a stock pusher collet for feeding stock in the manner described above is formed with a central stock-receiving bore which terminates at a flat bottom defining a radial seat which provides a positive end limit to the depth to which a bar may be inserted into the collet socket. The diametral slot which provides the resilience is cut through the collet from the stock-receiving end to a location well beyond the stock end engaging seat. An adjustment screw extends radially across the slot at a location between the radial seat and the bottom of the slot so that the two halves of the collet which are separated by the slot can be compressed toward each other to tighten the gripping force of the collet as required. The collet is initially designed to provide a minimum acceptable gripping force.

Other objects and features of the invention will become apparent by reference to the following specification and to the drawings.

IN THE DRAWINGS

FIG. 1 is a schematic diagram of a bar feeding apparatus embodying the present invention; and FIG. 2 is a longitudinal cross-sectional view of a collet and associated structure of a stock pusher employed in the feeding apparatus of FIG. 1.

DESCRIPTION OF THE PREFERRED EMBODIMENT

Figure 1:
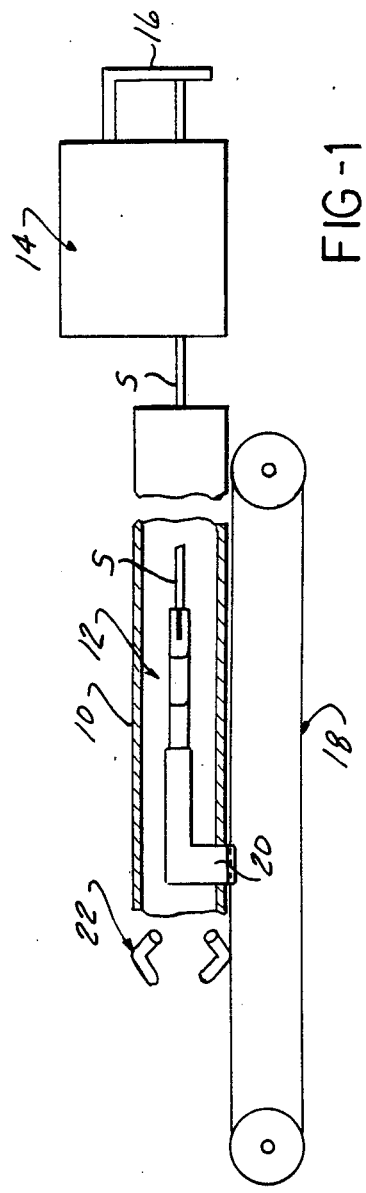

FIG. 1 shows, in schematic form, the general arrangement of a bar feeding apparatus embodying the present invention. Such apparatus generally is well known in the art and includes an elongate feed tube designated generally 10 suitably mounted upon a fixed frame (not shown) in a horizontal position. A stock pusher designated generally 12 is employed to advance a piece of elongate bar stock S from left to right as viewed in FIG. 1 through the feed tube 10 to a schematically illustrated machine tool designated generally 14 which will perform a forming operation upon that portion of the stock received by the tool and cut off and eject the formed portion. Pusher 12 is then actuated to again advance the stock until the cutoff end of the stock engages a stop, such as 16, on the tool, at which time the tool performs another forming and cutoff cycle.

The stock pusher 12 is driven in movement by an endless chain or cable drive designated generally 18, the pusher 12 being coupled to the chain or cable as by a plate-like bracket 20 projecting from the cable through a slot formed in the bottom of the tube 10. The cable drive is reversible, and when the final part has been cut from a given length of stock S, a suitable control system, not shown, reverses the drive to carry pusher 12 to the left as viewed in FIG. 1 away from machine tool 14. At this time, a remnant length of stock will be held by pusher 12. As the pusehr approaches the end of its return stroke, it actuates a suitable clamping mechanism designated generally 22 which, immediately after the passage of the pusher, closes to grip the stock remnant, withdraw it from the pusher and eject the remnant from the apparatus.

The structure generally described above is well known in the art and examples of such apparatus are shown, for example, in U.S. Pat. Nos. 3,066,806; 3,582,000; 3,924,494; 3,612,298 and 4,068,545. As shown in these patents, the apparatus normally will also include a magazine operable when the pusher has reached its end limit of movement in the return stroke, to feed a new length of stock into the apparatus in front of the pusher.

Figure 2:
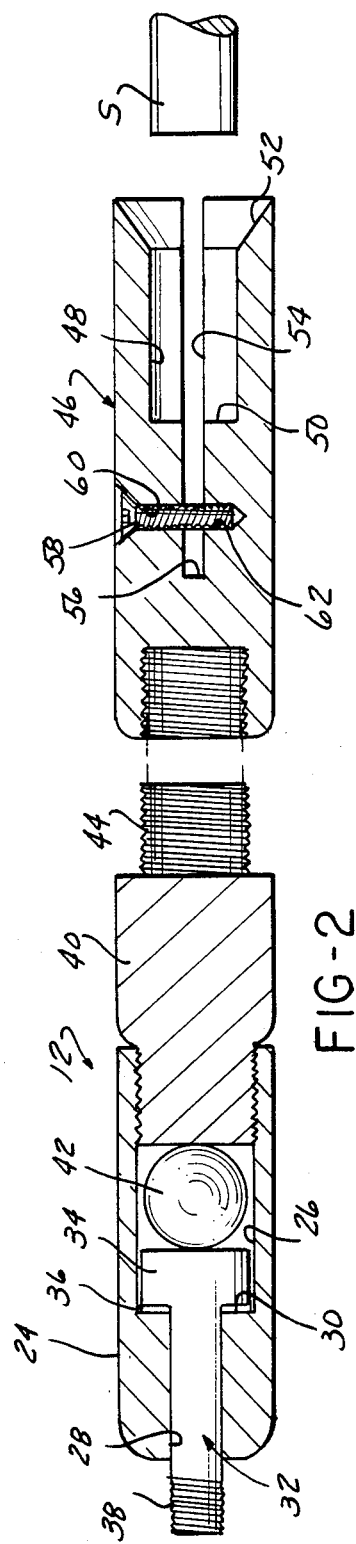

The present invention is not concerned with details of the overall apparatus, but is instead concerned with details of certain elements of the pusher 12 which are best shown in FIG. 2.

Referring to FIG. 2, a pusher 12 embodying the present invention includes a cylindrical housing 24 having a central longitudinal passage constituted by a large diameter bore 26 extending inwardly from the front or right-hand end as viewed in FIG. 2 of the housing and a small diameter bore 28 extending from a radial shoulder 30 at the inner end of bore 26 to the rearward end of housing 24 in coaxial relationship to bore 26. A coupling member designated generally 32 is rotatably received within the small diameter bore 28 of the housing and is formed with an enlarged head 34 seated against shoulder 30. If desired, a low-friction washer such as 36 may be seated between head 34 and shoulder 30. Coupling member 32, when in the assembled position shown in FIG. 2, projects rearwardly from housing 24 and is threaded at its projecting end, as at 38, to provide a means for attaching the assembly 12 to the plate 20 (FIG. 1) employed to attach pusher 12 to the drive chain or cable drive 18.

A mounting member or adapter 40 is threadably mounted into the forward end of large diameter bore 26 and a bearing ball 42 is engaged between the head 34 of coupling member 32 and adapter 40. The forward end of adapter 40 is formed with a threaded stud 44 upon which is mounted a resilient split socket member or collet designated generally 46. Collet 46 is formed with a bar receiving bore 48 which extends rearwardly from the front or right-hand end of collet 46 as viewed in FIG. 2 to terminate at a flat radial shoulder 50. The forward end of bore 48 is chamfered as at 52 to guide the end of a piece of stock S into bore 48. Bore 48 is of a slightly undersized diameter as compared to the nominal diameter of stock S and a diametral slot 54 extending entirely through collet 46 is cut from the forward end of the collet axially well beyond shoulder 50 to an inner end 56. Slot 54 enables the portions of collet 46 at opposite sides of the slot to expand radially away from each other to accommodate the insertion of the slightly oversized stock S into bore 48 and to cause the collet to resiliently grip the stock. Shoulder 50 provides a positive end limit to the depth to which the stock may be inserted into bore 48.

An adjustment screw 58 passes through a slightly enlarged, smooth-walled radial bore 60 in collet 46 at one side of slot 54 and is threadably received within an aligned radial bore 62 in the collet at the opposite side of the slot. The bores 60 and 62 are located axially of collet 46 between shoulder 50 and the inner end 56 of slot 54.

It is believed apparent that the resilient force with which collet 46 grips a piece of stock inserted into bore 48 may be increased by tightening screw 58.

As developed above, the tolerances to which collet 46 is manufactured are such that, in the absence of an adjustment such as that provided by screw 58, the resilient gripping force applied by the collet to a piece of stock cannot be precisely established in the original manufacturing operation and will tend to decrease in usage, particularly if stock at the larger end of the stock diameter tolerance is inserted too deeply into the collet socket. In the collet of the present invention, this latter problem is minimized by providing a positive stop 50 to limit the depth of insertion of the stock into the collet socket, while the provision of the adjustment provided by screw 58 enables the gripping force to be adjusted as required.

In its initial design, the collet 46 is so dimensioned that theoretical calculations of the gripping force should result in a collet having a minimum acceptable gripping force on the stock at the large end of the stock diameter tolerance range. If the initial operation of the collet finds this force to be too loose, the force may be readily increased by a simple adjustment of screw 58. The range of acceptable gripping forces is such that a collet designed to have the minimum acceptable gripping force will, with reasonable manufacturing precautions, not produce a collet having an unacceptably high gripping force if reasonable manufacturing tolerances are not exceeded.

While one embodiment of the invention has been described in detail, it will be apparent to those skilled in the art that the disclosed embodiment may be modified. Therefore, the foregoing description is to be considered exemplary rather than limiting and the true scope of the invention is that defined in the following claim.

What is claimed is:

1. In a bar feed apparatus for feeding elongate bar stock to a machine tool, said apparatus including reciprocable stock pusher means operable in a forward stroke to resiliently grip one end of a bar and longitudinally advance the bar in step-by-step movement to the tool, said pusher means being movable away from said tool in a return stroke to a bar receiving position wherein another elongate bar may be placed between said pusher means and said tool to be advanced to said tool by a subsequent forward stroke of said pusher means, and means operable during the return stroke of said pusher means for ejecting a bar remnant from said pusher means;

the improvement wherein said pusher means comprises a housing having a central passage extending longitudinally therethrough from front to rear, said passage having a relatively small diameter rear end portion and a relatively large diameter front end portion, a coupling member having a radially enlarged head seated at the rearward end of said front end portion of said passage and an integral shank extending rearwardly from said head through said rear end portion of said passage to project longitudinally from the rear of said housing, said coupling member and said housing being rotatable relative to each other about the longitudinal axis of said housing, a mounting member threadably mounted in the forward end of said front end portion of said passage, a bearing located in said passage and engaged between the rearward end of said mounting member and said head of said coupling member to maintain said head seated at said rearward end of said front end portion of said passage, a cylindrical article gripping socket member fixedly mounted on the forward end of said mounting member in coaxial relationship with the longitudinal axis of said housing, said socket member having a bar receiving axial bore extending rearwardly from the front end of said socket member to terminate at a flat bar end engaging seat and a diametral slot through said socket member extending axially rearwardly from the front end of said socket member to a location spaced rearwardly of said bar engaging seat to define a resilient bar end gripping collet, means defining a radial bore in said socket member at a location rearwardly of said seat and forwardly of the rearward end of said slot extending from one side of said socket member through said slot, and an adjustment screw rotatable in said radial bore at one side of said slot and threadably received in said radial bore at the opposite side of said slot for adjusting the bar gripping force of said collet.

* * * * *